UNITED STATES PATENT OFFICE.

SIDNEY G. THOMAS, OF 3 QUEEN'S ROAD VILLAS, COUNTY OF SURREY, ENGLAND.

IMPROVEMENT IN REFRACTORY FURNACE-LININGS.

Specification forming part of Letters Patent No. 218,335, dated August 5, 1879; application filed February 13, 1879; patented in England, November 23, 1877.

*To all whom it may concern:*

Be it known that I, SIDNEY GILCHRIST THOMAS, of 3 Queen's Road Villas, in the county of Surrey, England, have invented new and useful Improvements in Refractory Furnace-Linings, which are fully described in the following specification.

This invention consists in constructing tuyeres and Bessemer-converter bottoms, and also the hearths of open-hearth or other iron and steel furnaces, of a refractory basic compound formed of limestone and a solution of silicate of soda.

For the formation of this compound I prefer to take a magnesian limestone containing as much magnesia as possible, and, preferably, a little alumina, but not more than four or five per cent., and about the same amount of silica. This limestone I then grind thoroughly, and mix with from eight to ten per cent. of its weight of a solution of silicate of soda. The strength of the solution upon which this proportion is calculated is that which has a specific gravity of 1.5. A somewhat more dilute solution may, however, be used, or the solution may be slightly diluted with water to promote the mixture.

The compound may be conveniently mixed in an ordinary mortar-mill, and the mixture should be used within six to eight hours of its being made.

Ordinary, somewhat aluminous, limestone or magnesia may sometimes be substituted for magnesian limestone; but the latter is greatly to be preferred to the ordinary limestone, and magnesia is expensive.

In the manner above indicated a thoroughly plastic mass is formed, with which converter-bottoms, or the soles of open-hearth furnaces—such as Siemens, Martin, Ponsard, Pernot, or other furnaces—may be readily "rammed," in the usual way.

In the case of the open-hearth furnace, the newly-rammed sole (after drying) should be heated intensely for some time before introducing the charge. When this mixture is used for the hearth of a Siemens or similar furnace, and silica bricks for the roof, the roof and hearth should be separated by the best plumbago or refractory talc brick or blocks, or by other neutral material.

Bessemer tuyeres may be formed from the above-described mixture in the same manner as they are now made from fire-clay; but they should be dried slowly, and not fired at all, being simply dried in a stove, nothing beyond a black heat being permissible.

This silicate-of-soda mixture, when formed with about twelve per cent. of the silicate solution, may also be used as a cement for the basic lime bricks with which I line Bessemer converters or open-hearth furnaces, and for which purpose I find it of great practical utility.

What I claim as my invention, and desire to secure by Letters Patent, is—

The mixture hereinbefore described, to be used as and for the purposes set forth.

Witness my hand this 20th day of January, 1879.

SIDNEY GILCHRIST THOMAS.

Witnesses:
PHILIP M. JUSTICE,
ALLEN P. JONES.